US012541168B2

(12) United States Patent
Ikeda et al.

(10) Patent No.: US 12,541,168 B2
(45) Date of Patent: Feb. 3, 2026

(54) IMAGE FORMING APPARATUS

(71) Applicant: KYOCERA Document Solutions Inc., Osaka (JP)

(72) Inventors: Yuta Ikeda, Osaka (JP); Haruna Takamura, Osaka (JP); Yukiko Yoshimura, Osaka (JP); Mutsuki Kanda, Osaka (JP); Hideyuki Ogasawara, Osaka (JP); Ryota Maeda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 58 days.

(21) Appl. No.: 18/706,091

(22) PCT Filed: Oct. 24, 2022

(86) PCT No.: PCT/JP2022/039520

§ 371 (c)(1),
(2) Date: Apr. 30, 2024

(87) PCT Pub. No.: WO2023/080002

PCT Pub. Date: May 11, 2023

(65) Prior Publication Data

US 2025/0004412 A1 Jan. 2, 2025

(30) Foreign Application Priority Data

Nov. 2, 2021 (JP) ................................ 2021-179659
Nov. 2, 2021 (JP) ................................ 2021-179660
Nov. 2, 2021 (JP) ................................ 2021-179661

(51) Int. Cl.
*G03G 15/00* (2006.01)
*B65H 9/00* (2006.01)

(52) U.S. Cl.
CPC ......... *G03G 15/6567* (2013.01); *B65H 9/002* (2013.01); *G03G 15/5029* (2013.01);
(Continued)

(58) Field of Classification Search
CPC ........... G03G 15/6567; G03G 15/5029; B65H 9/002; B65H 2404/1526; B65H 2513/11; B65H 2557/262
See application file for complete search history.

(56) References Cited

U.S. PATENT DOCUMENTS

2006/0285903 A1* 12/2006 Yamane .................. B65H 9/16 399/394
2011/0311240 A1* 12/2011 Shirakata ........... G03G 15/6567 399/395

(Continued)

FOREIGN PATENT DOCUMENTS

JP 2006124137 A 5/2006
JP 2020007092 A 1/2020

(Continued)

*Primary Examiner* — David H Banh
(74) *Attorney, Agent, or Firm* — IP Business Solutions, LLC

(57) ABSTRACT

A controller that corrects tilt of recording paper by rotating a rotation board on which a resist roller pair for feeding recording paper to an image forming device is provided about a support as a rotation axis, and tilting roller shafts of the resist roller pair upstream or downstream with respect to a transport direction, and another controller that corrects a rotation speed of the resist roller pair based on a direction and amount of tilt of the roller shafts are included.

16 Claims, 11 Drawing Sheets

(52) U.S. Cl.
CPC .. *B65H 2404/1526* (2013.01); *B65H 2513/11* (2013.01); *B65H 2557/262* (2013.01)

(56) References Cited

U.S. PATENT DOCUMENTS

| | | | | |
|---|---|---|---|---|
| 2012/0262513 | A1* | 10/2012 | Mandel | B65H 7/02 347/16 |
| 2012/0262765 | A1* | 10/2012 | Saito | G03G 15/6567 271/227 |
| 2019/0161299 | A1* | 5/2019 | Egawa | B65H 7/10 |
| 2021/0171304 | A1* | 6/2021 | Ishido | B65H 7/20 |

FOREIGN PATENT DOCUMENTS

| | | | |
|---|---|---|---|
| JP | 2020050493 | A | 4/2020 |
| JP | 2020075802 | A | 5/2020 |
| JP | 2021091488 | A | 6/2021 |

* cited by examiner

IMAGE FORMING APPARATUS

TECHNICAL FIELD

The present invention relates to an image forming apparatus having a function of correcting a tilt of recording paper.

BACKGROUND ART

Generally, an image forming apparatus such as a copying machine or a multifunction device, which includes an image forming device that forms an image on recording paper, and a resist roller that nips the recording paper and adjusts a timing of supplying the recording paper to the image forming device, is known.

In such an image forming apparatus, there is a case where the recording paper is transported in a tilted state with respect to a predetermined transport direction of the recording paper. When the recording paper is transported to the image forming device in a tilted state, a tilted image is formed on the recording paper.

A technology using a resist roller to correct a tilt of recording paper is known. For example, roller rotation of the resist roller is temporarily stopped, a leading edge of the recording paper hits the stopped resist roller, and then, the rotation of the resist roller is restarted at an appropriate timing. When the recording paper hits the stopped resist roller, the recording paper is bent, and as a result, the tilt of the recording paper is corrected.

However, there is a problem in that when the recording paper hits the stopped resist roller, an impact sound is generated.

In order to solve such problems, for example, Patent Literatures 1 to 3 disclose technologies for correcting a tilt of recording paper without stopping roller rotation of the resist roller.

CITATION LIST

Patent Literature

Patent Literature 1

Japanese Unexamined Patent Application Publication No. 2020-075802

Patent Literature 2

Japanese Unexamined Patent Application Publication No. 2020-007092

Patent Literature 3

Japanese Unexamined Patent Application Publication No. 2020-050493

SUMMARY OF INVENTION

Technical Problem

Patent Literature 2 discloses a technology for correcting a tilt of recording paper by detecting the tilt of the recording paper with respect to a predetermined transport direction of the recording paper and tilting a roller shaft of a resist roller according to the tilt of the recording paper.

However, when the roller shaft of the resist roller is tilted, a timing at which the recording paper reaches the resist roller is affected. Specifically, when one end of the roller shaft of the resist roller is tilted upstream in the transport direction, a distance between the resist roller and the recording paper becomes shorter, and the recording paper reaches the resist roller faster. On the other hand, when the one end of the roller shaft of the resist roller is tilted downstream in the transport direction, the distance between the resist roller and the recording paper becomes longer, and the recording paper reaches the resist roller later.

There is a problem in that, when the timing at which the recording paper reaches the resist roller changes, a timing at which the recording paper is supplied to the image forming device is affected, and as a result, image formation on the recording paper is affected.

The present invention has been made in view of the above circumstances, and an object of the present invention is to make it possible to correct a tilt of recording paper while ensuring the supply of the recording paper to an image forming device at an appropriate timing.

Solution to Problem

An image forming apparatus according to an aspect of the present invention includes an image forming device configured to form an image on recording paper: resist rollers provided upstream of the image forming device in a predetermined recording paper transport direction and configured to feed the recording paper to the image forming device; a first controller configured to perform rotation control for the resist rollers: a tilt detection sensor configured to detect a tilt of the recording paper with respect to the transport direction; a tilt mechanism configured to tilt roller shafts of the resist rollers whose initial state is a state where the roller shafts are perpendicular to the transport direction, upstream or downstream with respect to the transport direction: and a second controller configured to perform control for causing the tilt mechanism to tilt the roller shaft upstream or downstream with respect to the transport direction based on a detection result of the tilt detection sensor, and causing the tilt mechanism to return the tilted roller shaft to the initial state when the recording paper reaches the resist roller. The second controller transmits tilt data indicating a direction and amount of tilt of the roller shaft to the first controller. The first controller corrects a rotation speed of the resist roller based on the direction and amount of tilt of the roller shaft indicated by the tilt data received from the second controller.

Advantageous Effects of Invention

According to the present invention, when the roller shaft of the resist roller is tilted according to the tilt of the recording paper, and the recording paper reaches the resist roller, the tilted roller shaft is returned to the initial state, so that the tilt of the recording paper can be corrected. Further, since the rotation speed of the resist roller is corrected based on the direction and amount of tilt of the roller shaft, the recording paper can be supplied to the image forming device at a timing appropriate for image formation even when the roller shaft is tilted. This makes it possible to correct a tilt of the recording paper while ensuring the supply of the recording paper to the image forming device at an appropriate timing.

DESCRIPTION OF EMBODIMENTS

First Embodiment

Figure 1:
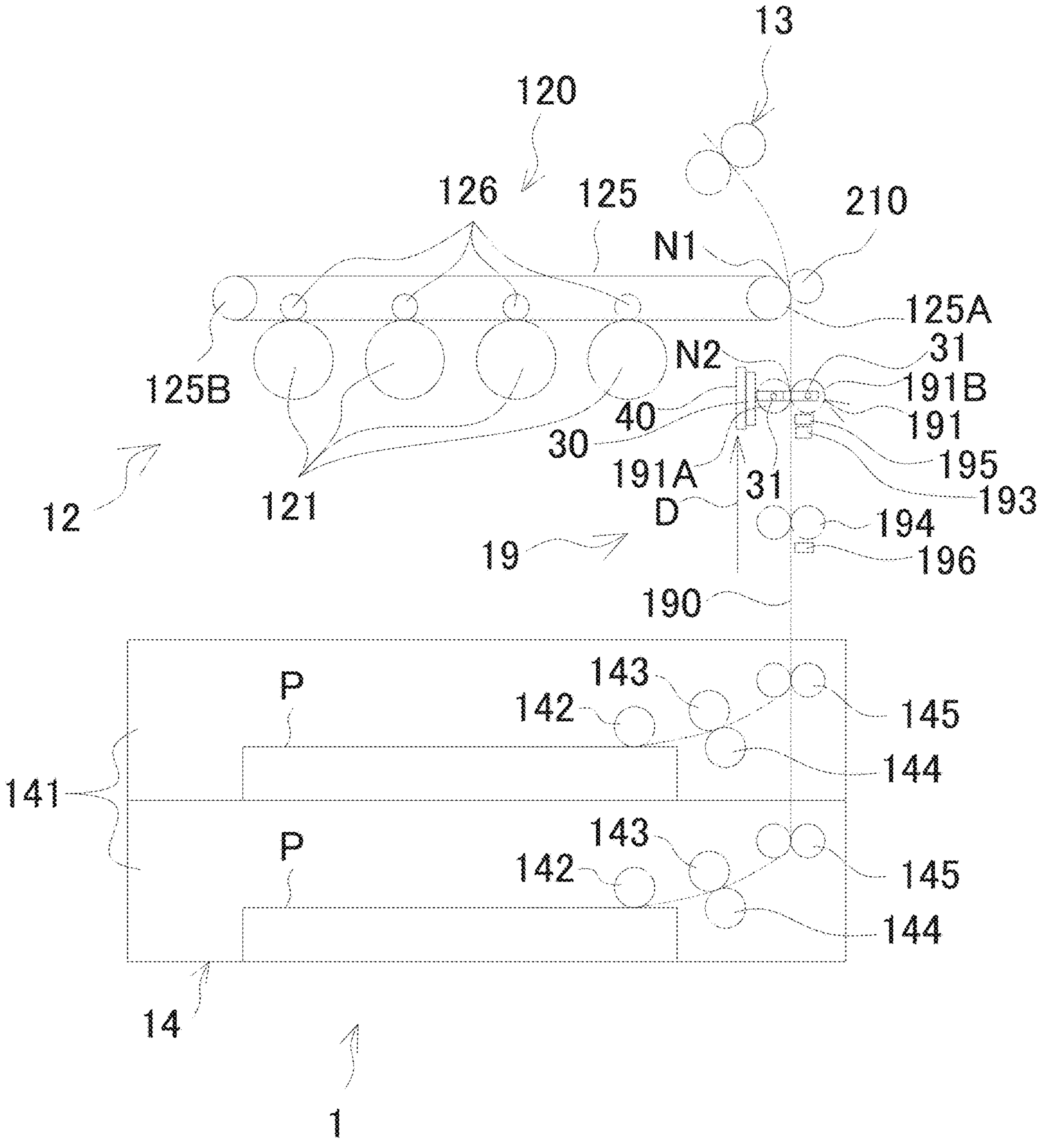
FIG. 1 is a schematic partial front view showing a structure of an image forming apparatus according to an embodiment of the present invention.

Hereinafter, an image forming apparatus according to a first embodiment of the present invention will be described with reference to the drawings. FIG. 1 is a schematic partial front view showing a structure of an image forming apparatus according to the first embodiment of the present invention. As shown in FIG. 1, the image forming apparatus 1 is a multifunction device that has a plurality of functions such as a copy function, a printer function, a scanner function, and a facsimile function. The image forming apparatus 1 includes an image forming device 12, a fixer 13, a paper feeder 14, and a transporter 19.

The image forming device 12 includes an intermediate transfer unit 120, photosensitive drums 121 for black, magenta, cyan, and yellow, and a secondary transfer roller 210. The intermediate transfer unit 120 includes an intermediate transfer belt 125 to which a toner image is transferred to an outer peripheral surface, a drive roller 125A, a driven roller 125B, and a primary transfer roller 126.

The intermediate transfer belt 125 stretches between the drive roller 125A and the driven roller 125B. The intermediate transfer belt 125 is driven by the drive roller 125A in a state where the intermediate transfer belt 125 abuts onto a circumferential surface of a photoreceptor drum 121, thereby traveling endlessly in synchronization with the photoreceptor drum 121.

The toner image of each color (black, magenta, cyan, and yellow) transferred onto the intermediate transfer belt 125 is superimposed on the intermediate transfer belt 125 at an adjusted transfer timing, so that a color toner image is obtained.

The secondary transfer roller 210 forms a nip portion N1 with the drive roller 125A with the intermediate transfer belt 125 interposed therebetween. The secondary transfer roller 210 transfers the color toner image formed on a surface of the intermediate transfer belt 125 to the recording paper P transported from the paper feeder 14 via a transport path 190 at the nip portion N1. The recording paper P onto which the toner image has been transferred at the nip portion N1 is transported to the fixer 13.

The transporter 19 includes the transport path 190, a resist roller pair 191 provided along the transport path 190 upstream of the nip portion N1 (that is, an image forming position where an image is formed by the image forming device 12) in the transport direction D of the recording paper P, a tilt detection sensor 193 provided along the transport path 190 upstream of the resist roller pair 191 in the transport direction D, an intermediate transport roller pair 194 provided along the transport path 190 between the resist roller pair 191 and the paper feeder 14, a resist sensor 195 provided along the transport path 190 near the resist roller pair 191, and an intermediate sensor 196 provided along the transport path 190 near the intermediate transport roller pair 194.

The resist roller pair 191 includes a drive resist roller 191A and a driven resist roller 191B that rotates following the drive resist roller 191A. The drive resist roller 191A and the driven resist roller 191B form a nip portion N2. The resist roller pair 191 feeds the recording paper P to the image forming device 12. The resist roller pair 191 adjusts a timing at which the recording paper P is transported to the nip portion N1.

The tilt detection sensor 193 detects the tilt of the recording paper P with respect to the transport direction D. In the present embodiment, the tilt detection sensor 193 is a Contact Image Sensor (CIS), which is a type of line sensor. The tilt detection sensor 193 detects image data on one side of the recording paper P. The tilt detection sensor 193 is disposed parallel to a direction perpendicular to the transport direction D.

The intermediate transport roller pair 194 transport the recording paper P toward the resist roller pair 191.

The resist sensor 195 detects that a leading edge of the recording paper P has reached the resist roller pair 191. The intermediate sensor 196 detects that the leading edge of the recording paper P has reached the intermediate transport roller pair 194. The resist sensor 195 and the intermediate sensor 196 are, for example, known reflective photoelectric sensors that include a light emitting element and a light receiving element that detects reflected light of the light emitted from the light emitting element on the recording paper P, and detect the leading edge of the recording paper P.

The paper feeder 14 includes a plurality of paper feed cassettes 141. Each of the paper feed cassettes 141 includes a pickup roller 142, a feed roller 143, a retard roller 144 disposed opposite to the feed roller 143, and a transport roller pair 145.

The pickup roller 142 picks up the recording paper P stored in the paper feed cassette 141. The feed roller 143 and the retard roller 144 separate the recording sheets P picked up by the pickup roller 142 one by one and transport the recording sheets P toward the transport roller pair 145.

Figure 2:
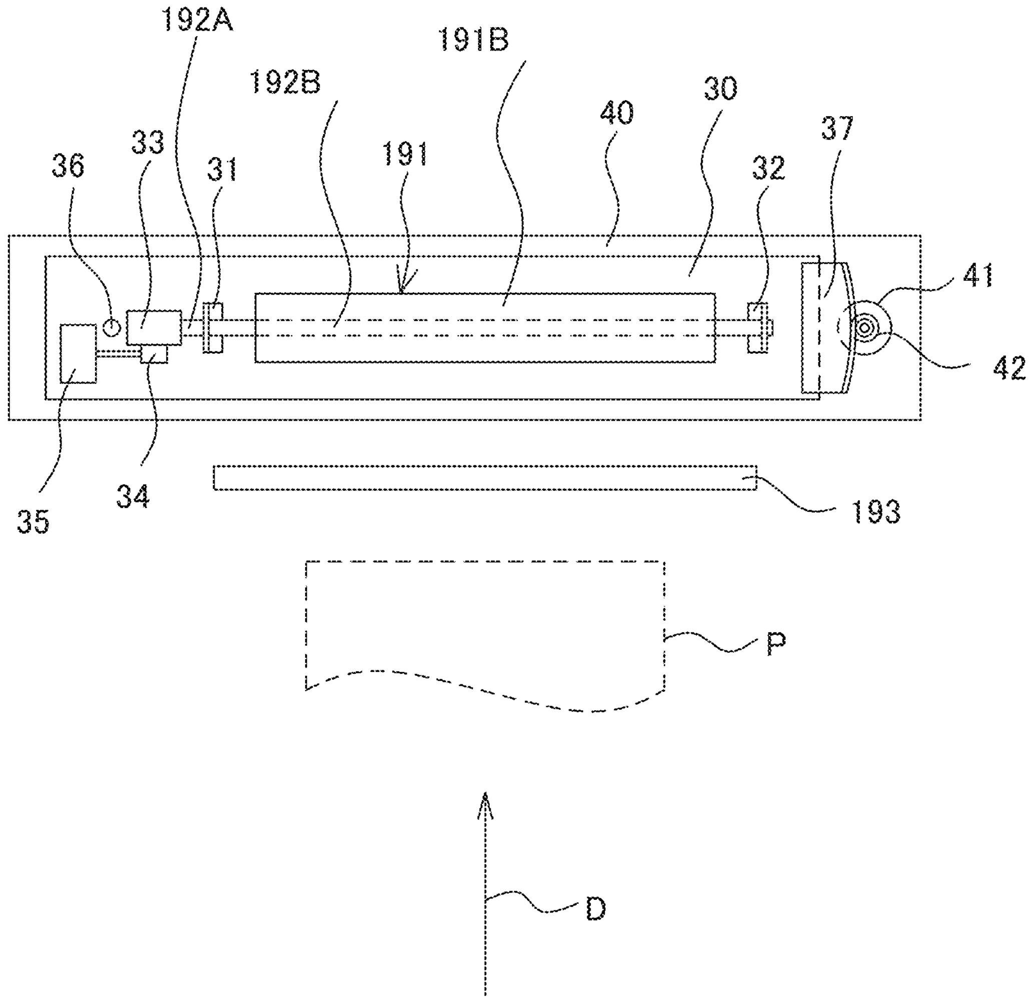
FIG. 2 is a side view schematically showing a resist roller pair and surrounding portions of the resist roller pair.

FIG. 2 is a side view schematically showing the resist roller pair 191 and the peripheral portion of the resist roller pair 191. As shown in FIG. 1, the resist roller pair 191 includes a drive resist roller 191A and a driven resist roller 191B. The drive resist roller 191A and the driven resist roller 191B each include roller shafts 192A and 192B (hereinafter sometimes simply referred to as “roller shaft 192”). In FIG. 2, the roller shaft 192A is located directly behind the roller shaft 192B in a depth direction of FIG. 2. Further, the drive resist roller 191A is also located directly behind the driven resist roller 191B in the depth direction of FIG. 2. The drive resist roller 191A, the driven resist roller 191B, and the roller shafts 192A and 192B are provided on the side in front of a paper surface in FIG. 2 with respect to a rotation board 30. A state where the roller shaft 192 of the resist roller pair 191 is perpendicular to the transport direction D of the recording paper P, as shown in FIG. 2, is an initial state of the roller shaft 192 of the resist roller pair 191.

The resist roller pair 191 is provided on the rotation board 30. The rotation board 30 is provided with bearings 31 and 32 of the roller shaft 192A, a drive gear 33, a connection gear 34, a shaft drive motor 35, and a support 36. A bearing 31 of the roller shaft 192A is provided to overlap a bearing 31 of the roller shaft 192B, and a bearing 32 of the roller shaft 192A is provided to overlap a bearing 32 of the roller shaft 192B. That is, the bearings 31 and 32 of the roller shaft 192B are provided on the rotation board 30 via the bearings 31 and 32 of the roller shaft 192A (see FIG. 1).

The bearings 31 and 32 of the roller shaft 192A of the drive resist roller 191A rotatably support the roller shaft 192A (drive shaft). The bearings 31 and 32 of the roller shaft 192B of the driven resist roller 191B rotatably support the roller shaft 192B (drive shaft).

The drive gear 33 that rotates together with the roller shaft 192A is fixed to a shaft end of the roller shaft 192A of the drive resist roller 191A. The drive gear 33 meshes with a connection gear 34 fixed to an output shaft of the shaft drive motor 35. Accordingly, the resist roller pair 191 is rotated through the driving of the shaft drive motor 35.

The support 36 is fixed to a support board 40 that is fixed to a part of a device body of the image forming apparatus 1. The support 36 is, for example, a cylindrical projection, and is loosely fitted into a hole portion provided in the rotation board 30. The support board 40 rotatably supports the rotation board 30 via the support 36. The support board 40 is provided with a turning motor 41, and a pinion gear 42 attached to an output shaft of the turning motor 41 to turn together with the output shaft.

A rack gear 37 is provided at one end portion of the rotation board 30 on the bearing 32 side. The rack gear 37 meshes with the pinion gear 42 fixed to the output shaft of the turning motor 41. Accordingly, the rotation board 30 is rotated about the support 36 as a rotation axis by the turning motor 41. Therefore, when the turning motor 41 is rotated clockwise in the figure, the bearing 32 side of the resist roller pair 191 is tilted downstream in the transport direction D of the recording paper P with the bearing 31 side of the resist roller pair 191 as a rotation center (hereinafter, this state will be referred to as a state where the resist roller pair 191 is tilted downstream in the transport direction D). On the other hand, when the turning motor 41 is rotated counterclockwise in the figure, the bearing 32 side of the resist roller pair 191 is tilted upstream in the transport direction D of the recording paper P with the bearing 31 side of the resist roller pair 191 as the rotation center (hereinafter, this state will be referred to as a state where the resist roller pair 191 is tilted upstream in the transport direction D). A configuration including the rotation board 30, the support 36, the rack gear 37, the support board 40, the turning motor 41, and the pinion gear 42 is an example of a tilt mechanism in the claims.

Figure 3:
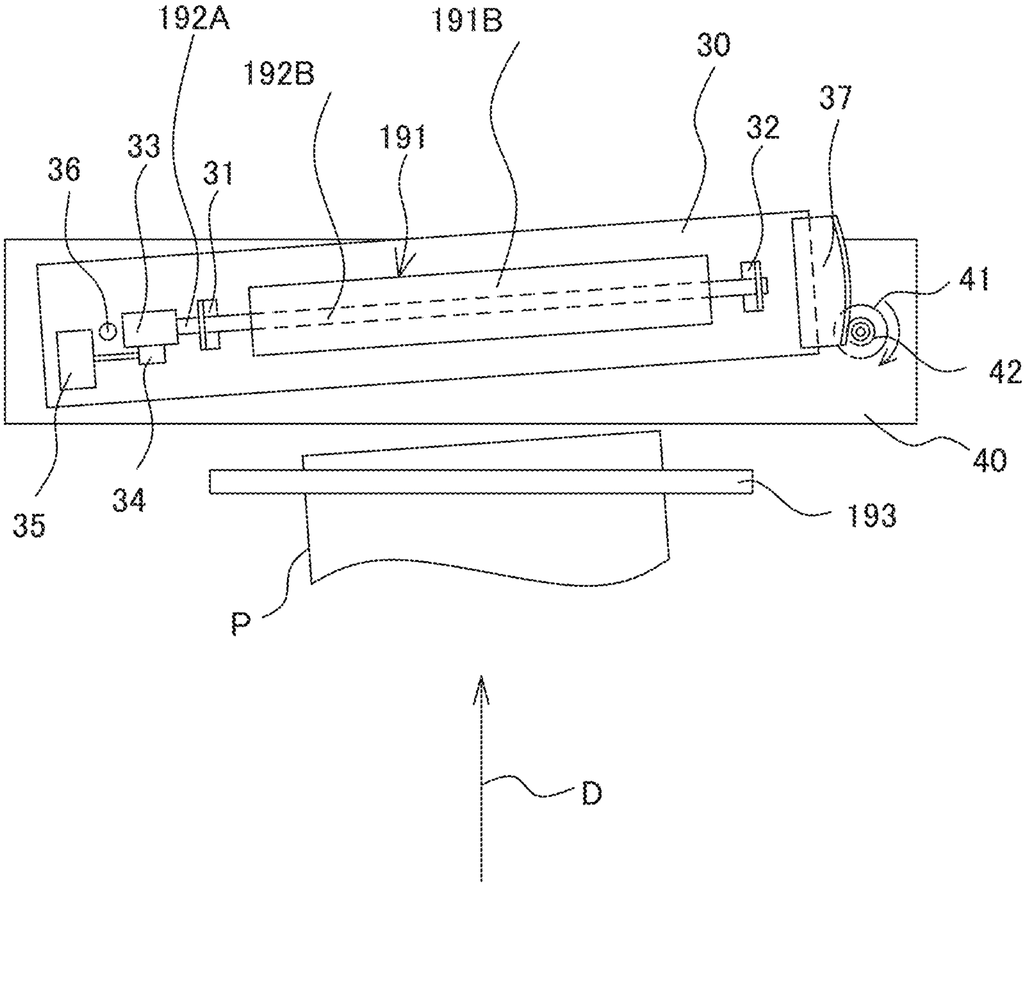
FIG. 3 is a diagram illustrating an example of a tilting operation of the resist roller pair.

FIG. 3 is a diagram showing an example of a state where the resist roller pair 191 is tilted toward the downstream side in the transport direction D. When the output shaft of the turning motor 41 rotates clockwise in the figure, the rotation board 30 is rotated counterclockwise about the support 36 as the rotation axis, and the roller shaft 192 of the resist roller pair 191 is tilted downstream in the transport direction D.

Figure 4:
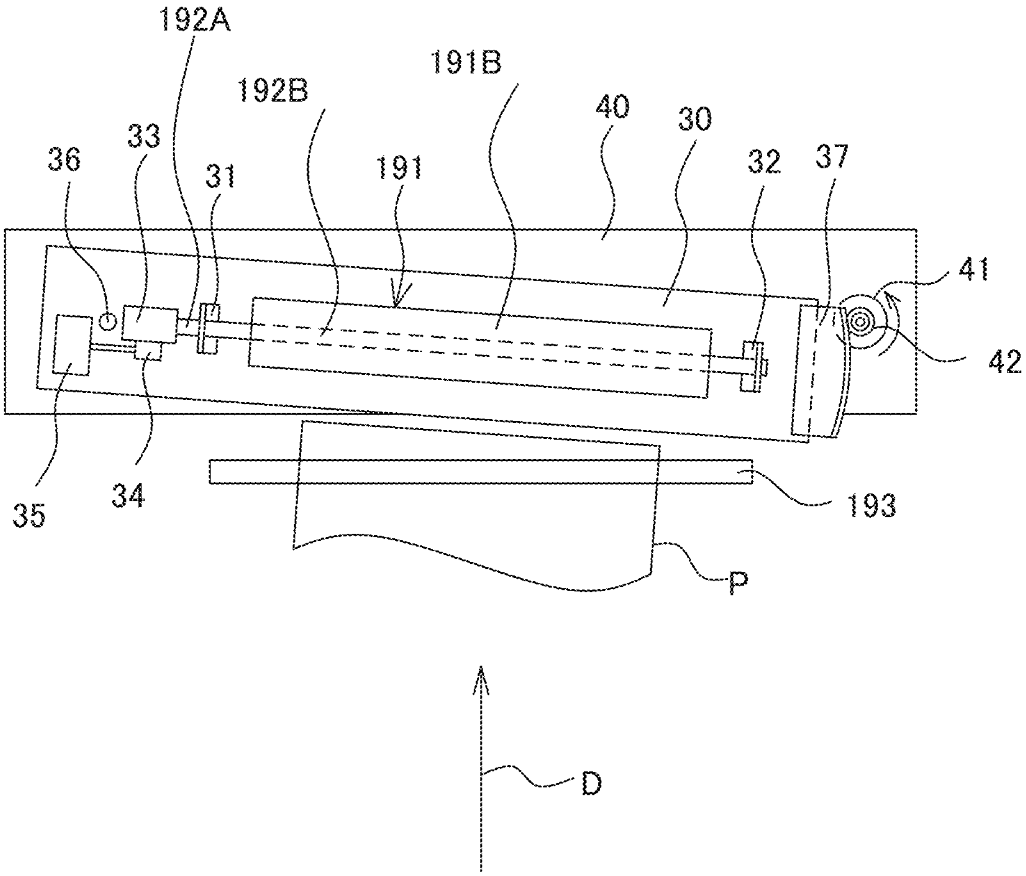
FIG. 4 is a diagram illustrating another example of the tilting operation of the resist roller pair.

FIG. 4 is a diagram showing an example of a state where the resist roller pair 191 is tilted upstream in the transport direction D. When the output shaft of the turning motor 41 rotates counterclockwise in the figure, the rotation board 30 rotates clockwise about the support 36 as the rotation axis, and the roller shaft 192 of the resist roller pair 191 tilts upstream in the transport direction D.

As shown in FIGS. 3 and 4, when the rotation board 30 is rotated and the roller shaft 192 of the resist roller pair 191 is tilted to be parallel to a side of the leading edge of the recording paper P, the recording paper P is transported at a posture not tilted with respect to the resist roller pair 191, enters the nip portion N2 (FIG. 1) formed by the resist roller pair 191, and is nipped.

After the recording paper P is nipped in the nip portion N2 formed by the resist roller pair 191, the rotation board 30 is rotated in the opposite direction to return the roller shaft 192 of the resist roller pair 191 to the initial state so that the tilt of the recording paper P can be corrected. That is, the tilt of the recording paper P is corrected.

Figure 5:
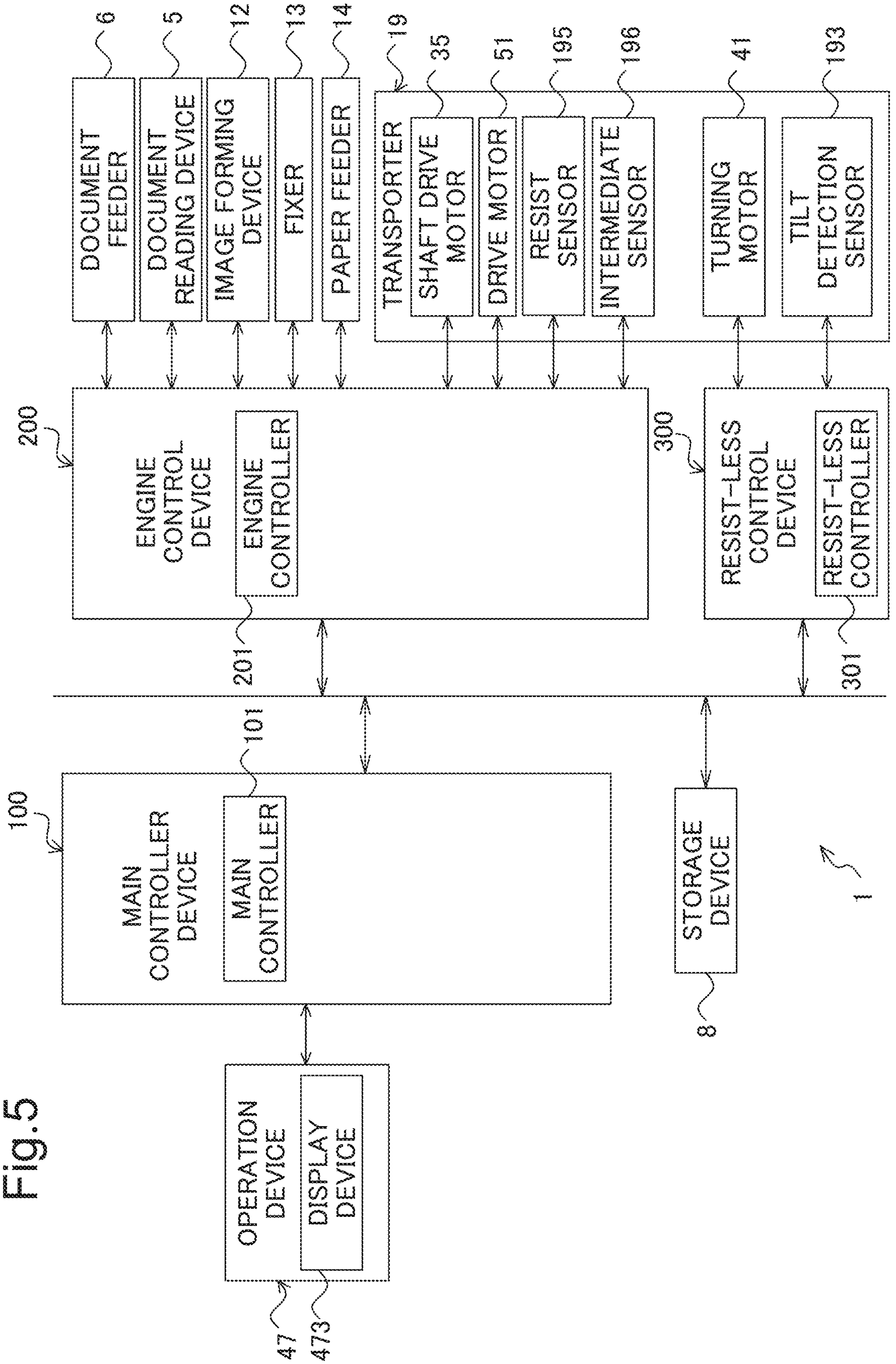
FIG. 5 is a functional block diagram schematically showing a main internal configuration of the image forming apparatus.

FIG. 5 is a functional block diagram schematically showing a main internal configuration of the image forming apparatus 1. The image forming apparatus 1 includes a main control device 100, an engine control device 200, a resistless control device 300, a document feeder 6, a document reading device 5, the image forming device 12, the fixer 13, the paper feeder 14, and the transporter 19, an operation device 47, and a storage device 8. The same components as those of the image forming apparatus 1 shown in FIG. 1 are denoted by the same reference signs, and detailed description thereof will be omitted.

The document feeder 6 is provided on an upper surface of the document reading device 5 so that the document feeder 6 can be opened and closed by a hinge or the like. The document feeder 6 functions as a document holding cover when reading a document placed on a platen glass. The document feeder 6 is an automatic document feed device called auto document feeder (ADF). The document feeder 6 includes a document placement tray, and supplies a document placed on the document placement tray to the document reading device 5.

A case where the image forming apparatus 1 performs a document reading operation will be described. The document reading device 5 optically reads an image of a document supplied to the document reading device 5 by the document feeder 6 or a document placed on the platen glass to generate image data. The image data generated by the document reading device 5 is stored in an image memory or the like.

A case where an image forming operation is performed in the image forming apparatus 1 will be described. Based on the image data generated by the document reading device 5 or image data received from a computer as an external device connected to a network, the image forming device 12 forms a toner image on the recording paper P as a recording medium fed from the paper feeder 14.

The fixer 13 heats and presses the recording paper P on which the toner image has been formed by the image forming device 12 to fix the toner image on the recording paper P. The recording paper P subjected to fixing processing is discharged to a discharge tray. The paper feeder 14 includes a plurality of paper feed cassettes 141 shown in FIG. 1.

The transporter 19 transports the recording paper P toward the image forming device 12 along the transport path 190 shown in FIG. 1. The transporter 19 includes a shaft drive motor 35, a drive motor 51 that supplies a rotational driving force to a roller shaft of the intermediate transport roller pair 194 shown in FIG. 1, a resist sensor 195, an intermediate sensor 196, the turning motor 41, and a tilt detection sensor 193.

The storage device 8 is a large capacity storage device such as a hard disk drive (HDD) or a solid state drive (SSD). The storage device 8 stores various control programs or the like.

The operation device 47 includes various hard keys or the like. The operation device 47 receives user instructions regarding various operations and processing that can be executed by the image forming apparatus 1, such as an instruction to execute an image forming operation, through the hard keys. The operation device 47 includes a display device 473 that displays operation guidance and the like to a user. The operation device 47 receives an input of an user instruction based on an operation of the user with respect to an operation screen displayed on the display device 473 (a touch operation) or an operation of the user with respect to the hard keys via the touch panel included in the display device 473.

The display device 473 is configured of a liquid crystal display (LCD) or the like. The display device 473 includes a touch panel. When a user performs an operation of touching a button or key displayed on a screen, the touch panel receives an instruction associated with a position of the touch operation.

The main control device 100, the engine control device 200, and the resist-less control device 300 each include a processor, a random access memory (RAM), a read only memory (ROM), and a dedicated hardware circuit. The processor is, for example, a central processing unit (CPU), an application specific integrated circuit (ASIC), or a micro processing unit (MPU).

The main control device 100 functions as a main controller 101 through an operation of the processor according to a first control program stored in the storage device 8. The engine control device 200 functions as an engine controller 201 through an operation of the processor according to a second control program stored in the storage device 8. The resist-less control device 300 functions as a resist-less controller 301 through an operation of the processor according to a third control program stored in the storage device 8. The first to third programs may be configured by the same control program.

The engine controller 201 and the resist-less controller 301 are examples of a first controller and a second controller in the claims, respectively.

The main controller 101 and the like can be configured of a hardware circuit, instead of operating according to a control program in the main control device 100 or the like. Hereinafter, the same applies to each embodiment unless otherwise mentioned.

Furthermore, in the present embodiment, an engine controller 201 that controls a portion that performs image formation is provided separately from the main controller 101, but the present invention is not limited to the present embodiment. For example, the engine controller 201 and the main controller 101 may be integrated, and the main controller 101 may execute a function and processing of the engine controller 201.

For data communication between the main controller 101, the engine controller 201, and the resist-less controller 301, serial communication via a first communication line is used, for example.

The main controller 101 controls an overall operation of the image forming apparatus 1. The main controller 101 is connected to the operation device 47. The main controller 101 receives instructions input through a touch operation with respect to the operation device 47 or the like by a user. The main controller 101 controls a display of the display device 473.

The engine control device 200 is connected to the document feeder 6, the document reading device 5, the image forming device 12, the fixer 13, the paper feeder 14, and the transporter 19. The engine controller 201 performs, for example, drive control of each of these units. For example, the engine controller 201 performs rotation control for the resist roller pair 191 in order to feed the recording paper P to the image forming device 12. Specifically, the engine controller 201 performs the rotation control for the resist roller pair 191 by controlling the shaft drive motor 35.

The resist-less control device 300 is connected to the turning motor 41 and the tilt detection sensor 193 of the transporter 19. The resist-less controller 301 controls the turning motor 41 based on a detection result of the tilt detection sensor 193, so that the roller shaft 192 of the resist roller pair 191 tilts upstream or downstream with respect to the transport direction D, thereby correcting the tilt of the recording paper P.

The resist-less controller 301 uses serial communication to transmit tilt data indicating the direction and amount of tilt of the roller shaft 192 to the engine controller 201.

The engine controller 201 corrects the rotation speed of the resist roller pair 191 based on the direction and amount of tilt of the roller shaft 192 indicated by the tilt data received from the resist-less controller 301.

As shown in FIG. 3, when the resist roller pair 191 is tilted downstream with respect to the transport direction D, a distance from the recording paper P to the nip portion N2 formed by the resist roller pair 191 becomes longer than in the initial state, and thus, a timing at which the recording paper P is nipped in the nip portion N2 is delayed compared to a case where the resist roller pair 191 is not tilted. Therefore, the engine controller 201 performs a correction for increasing the rotation speed of the resist roller pair 191. Accordingly, a timing discrepancy is adjusted.

On the other hand, as shown in FIG. 4, when the resist roller pair 191 is tilted upstream with respect to the transport direction D, the distance from the recording paper P to the nip portion N2 formed by the resist roller pair 191 becomes smaller than in the initial state, and thus, the timing at which the recording paper P is nipped in the nip portion N2 becomes earlier than when the resist roller pair 191 is not tilted. Therefore, the engine controller 201 performs a correction for decreasing the rotation speed of the resist roller pair 191. Accordingly, the timing discrepancy is adjusted.

Figure 6:
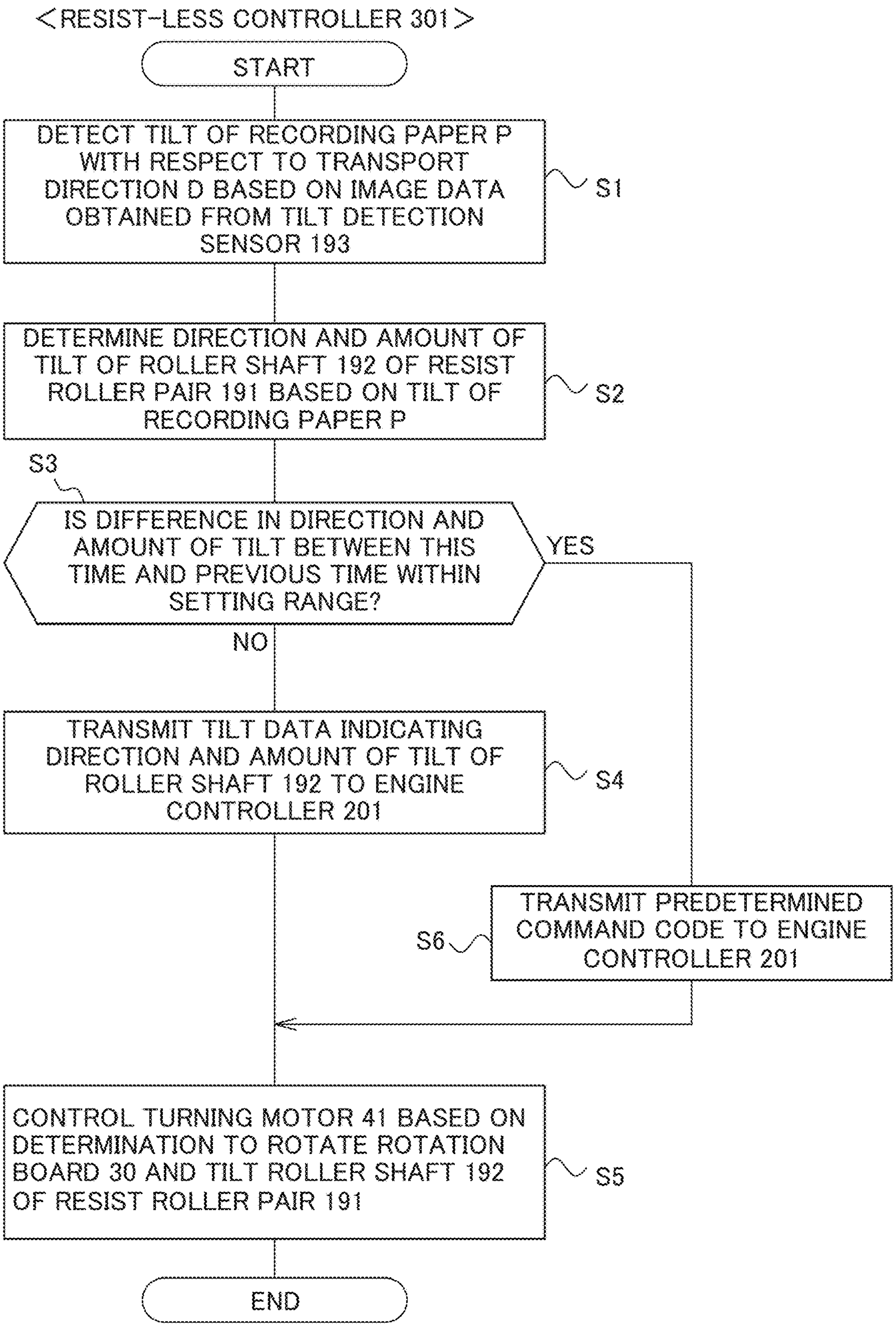
FIG. 6 is a flowchart showing an example of first roller shaft tilt processing.

Next, an example of the first roller shaft tilt processing performed by the resist-less controller 301 will be described with reference to the flowchart shown in FIG. 6 and the like. The resist-less controller 301 performs the first roller shaft tilt processing when the leading edge of the recording paper P is detected based on the image data detected by the tilt detection sensor 193.

The resist-less controller 301 detects the tilt of the recording paper P with respect to the transport direction D based on the image data detected by the tilt detection sensor 193 (step S1). The resist-less controller 301 determines the direction and amount of tilt of the roller shaft 192 of the resist roller pair 191 for making the roller shaft 192 of the resist roller pair 191 parallel to the side of the leading edge of the recording paper P, based on the detected tilt of the recording paper P (step S2).

The resist-less controller 301 determines whether or not a difference between a direction and amount of tilt of the roller shaft 192 determined at a current time and a direction and amount of tilt of the roller shaft 192 determined at a previous time is within a predetermined setting range (step S3).

When the resist-less controller 301 determines that a difference in the direction and amount of tilt of the roller shaft 192 between the current time and the previous time is not within the predetermined setting range (NO in step S3), the resist-less controller 301 transmits tilt data indicating the direction and amount of tilt of the roller shaft 192 determined at a current time to the engine controller 201 through serial communication (step S4). After step S4, the resist-less controller 301 controls the turning motor 41 based on the direction and amount of tilt of the roller shaft 192 determined at a current time to rotate the rotation board 30 and tilt the roller shaft 192 of the resist roller pair 191 (step S5).

On the other hand, when the resist-less controller 301 determines that the difference in the direction and amount of tilt of the roller shaft 192 between the current time and the previous time is within the predetermined setting range (that is, there is no large difference between the current time and the previous time) (YES in step S3), the resist-less controller 301 transmits a predetermined command code having a smaller amount of data than the tilt data to the engine controller 201 through serial communication (step S6). After step S6, the resist-less controller 301 controls the turning motor 41 based on the direction and amount of tilt of the roller shaft 192 determined at a current time to rotate the rotation board 30 and tilt the roller shaft 192 of the resist roller pair 191 (step S5).

Since there is no need to transmit information indicating the direction and amount of tilt of the roller shaft 192 as the command code, and any simple information is sufficient, it is easy to make an amount of data smaller than the amount of tilt data. For example, the resist-less controller 301 may transmit, as the command code, data indicating a value that is impossible as a value indicated by the tilt data.

Figure 7:
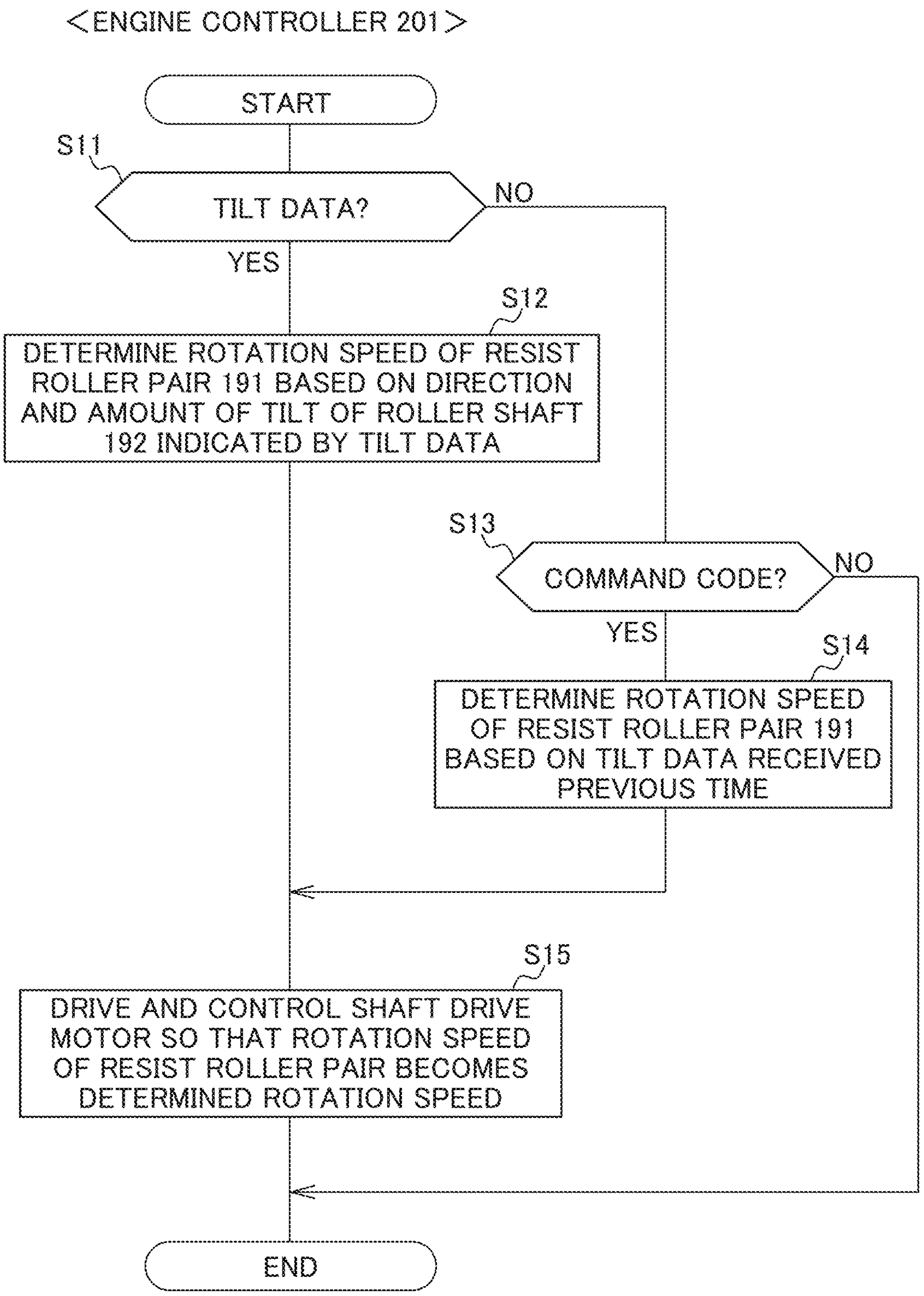
FIG. 7 is a flowchart showing an example of first rotation speed adjustment processing.

Next, an example of the first rotation speed adjustment processing performed by the engine controller 201 will be described with reference to a flowchart shown in FIG. 7 and the like. The engine controller 201 performs the first rotation speed adjustment processing when receiving data transmitted from the resist-less controller 301 through serial communication.

The engine controller 201 determines whether or not the received data is tilt data (step S11). When the engine controller 201 determines that the received data is tilt data (YES in step S11), the engine controller 201 determines the rotation speed of the resist roller pair 191 according to the direction and amount of tilt of the roller shaft 192 indicated by the tilt data (step S12). For example, a non-volatile memory or the storage device 8 built into the engine control device 200 stores a data table indicating the rotation speed of the resist roller pair 191 associated with a combination of the direction and amount of tilt of the roller shaft 192. The engine controller 201 uses the data table to determine the rotation speed of the resist roller pair 191 according to the direction and amount of tilt of the roller shaft 192 indicated by the tilt data. Alternatively, the nonvolatile memory or the storage device 8 built into the engine control device 200 stores each coefficient associated with the combination of the direction and amount of tilt of the roller shaft 192. Using the coefficient, the engine controller 201 calculates and determines the rotation speed of the resist roller pair 191 according to the direction and amount of tilt of the roller shaft 192 indicated by the tilt data.

After the processing in step S12, the engine controller 201 drives and controls the shaft drive motor 35 so that the rotation speed of the resist roller pair 191 becomes the determined rotation speed of the resist roller pair 191 (step S15). Accordingly, the rotation speed of the resist roller pair 191 is corrected. The processing in step S15 is performed after the resist-less controller 301 tilts the roller shaft 192 of the resist roller pair 191 based on the determined direction and amount of tilt of the roller shaft 192 (that is, after step S5 shown in FIG. 6).

On the other hand, when the engine controller 201 determines that the received data is not tilt data (NO in step S11), the engine controller 201 determines whether or not the received data is the command code (step S13). When the engine controller 201 determines that the received data is the command code (YES in step S13), the engine controller 201 determines the rotation speed of the resist roller pair 191 according to the direction and amount of tilt of the roller shaft 192 indicated by the tilt data received previous time using the data table or coefficients (step S14). After the processing in step S14, the engine controller 201 drives and controls the shaft drive motor 35 so that the rotation speed of the resist roller pair 191 becomes the determined rotation speed of the resist roller pair 191 (step S15). Accordingly, the rotation speed of the resist roller pair 191 is corrected.

After the processing in step S15, when the resist-less controller 301 receives a signal indicating that the leading edge of the recording paper P has been detected, which is transmitted from the resist sensor 195, the resist roller pair calculates a nip timing at which the side of the leading edge of the recording paper P is completely nipped by the resist roller pair 191 (that is, a timing at which the recording paper P reaches the resist roller pair 191) based on a reception timing of the signal. For example, the resist-less controller 301 calculates, as the nip timing, a time when a predetermined time has elapsed from the reception timing. When the calculated nip timing arrives, the resist-less controller 301 controls the turning motor 41 to rotate the rotation board 30 and return the roller shaft 192 of the resist roller pair 191 to an initial state.

Here, in step S12 and step S14, the rotation speed of the resist roller pair 191 determined by the engine controller 201 is set to a rotation speed at which a timing at which the leading edge of the recording paper P fed by the resist roller pair 191 when the resist roller pair 191 tilted as described above is returned to the initial state in a state where the resist roller pair 191 nips the recording paper P reaches the nip portion N1 between the intermediate transfer belt 125 and the drive roller 125A becomes a timing at which the leading edge reaches in a case where the recording paper P is not tilted with respect to the transport direction D, the resist roller pair 191 remains in the initial state, and the recording paper P is fed by the resist roller pair 191 at a rotation speed before correction.

When the engine controller 201 determines that the received data is not the command code (NO in step S13), that is, when the engine controller 201 does not receive any one of the tilt data and the command code, the engine controller 201 ends the first rotation speed adjustment processing.

According to the first embodiment, since the tilted roller shaft 192 of the resist roller pair 191 is returned to the initial state at a timing when the roller shaft 192 of the resist roller pair 191 is tilted according to the tilt of the recording paper P, and the side of the leading edge of the recording paper P is completely nipped by the resist roller pair 191, the tilt of the recording paper P can be corrected to be a normal state where the side of the leading edge of the recording paper P is perpendicular to the transport direction D. Further, since the rotation speed of the resist roller pair 191 is corrected based on the direction and amount of tilt of the roller shaft 192, the recording paper P can be supplied to the image forming device 12 at an appropriate timing even when the roller shaft 192 is tilted. This makes it possible to correct the tilt of the recording paper P while ensuring supply of the recording paper P to the image forming device 12 at the appropriate timing.

Further, according to the first embodiment, when the resist-less controller 301 determines that the difference in the direction and amount of tilt of the roller shaft 192 between this time and the previous time is within the predetermined setting range (that is, there is no large difference between this time and the previous time), the resist-less controller 301 transmits the command code having a smaller amount of data than the tilt data to the engine controller 201 through serial communication, instead of the tilt data.

This makes it possible to reduce a time for which resources such as a CPU are occupied by communication. Further, it is possible to shorten a time required for communication by reducing an amount of communication data. As a result, a shift to the tilt control for the roller shaft 192 performed by the resist-less controller 301 after communication becomes faster, and transport control of the recording paper P is performed with good responsiveness. Further, correction control of the rotation speed of the resist roller pair 191 by the engine controller 201 also starts earlier.

In the first embodiment, the resist-less controller 301 transmits the command code to the engine controller 201 when the resist-less controller 301 determines that the difference in the direction and amount of the tilt of the roller shaft 192 between the current time and the previous time is within the predetermined setting range, but the present invention is not limited to such an embodiment. For example, as another embodiment, the resist-less controller 301 may transmit the command code to the engine controller 201 only when the direction and amount of tilt of the roller shaft 192 determined at a current time are the same as the direction and amount of tilt of the roller shaft 192 determined at a previous time.

Furthermore, when the resist-less controller 301 detects a communication abnormality for the transmission of any one of the tilt data and the command code, the resist-less controller 301 may execute transmission retry processing.

Second Embodiment

Hereinafter, an image forming apparatus 1 according to a second embodiment of the present invention will be described with reference to the drawings. The image forming apparatus 1 according to the second embodiment has the same configuration as the image forming apparatus 1 according to the first embodiment, except that the resist-less controller 301 executes second roller shaft tilt processing instead of the first roller shaft tilt processing, and the engine controller 201 executes second rotation speed adjustment processing instead of the first rotation speed adjustment processing. Hereinafter, the same configuration as that of the image forming apparatus 1 according to the first embodiment will not be repeatedly described.

Figure 8:
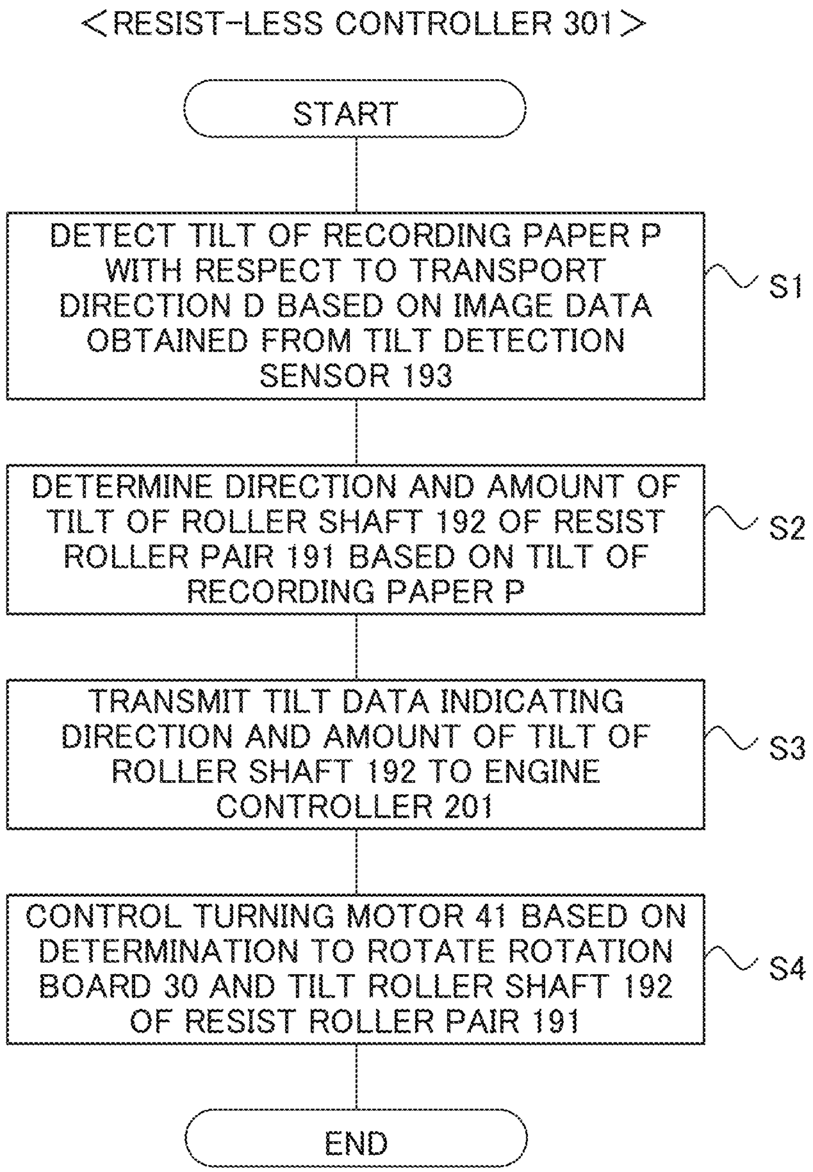
FIG. 8 is a flowchart showing an example of second roller shaft tilt processing.

Next, an example of the second roller shaft tilt processing performed by the resist-less controller 301 will be described with reference to a flowchart shown in FIG. 8 or the like. The resist-less controller 301 performs the second roller shaft tilt processing when the leading edge of the recording paper P is detected based on the image data detected by the tilt detection sensor 193.

The resist-less controller 301 detects the tilt of the recording paper P with respect to the transport direction D based on the image data detected by the tilt detection sensor 193 (step S1). The resist-less controller 301 determines the direction and amount of tilt of the roller shaft 192 of the resist roller pair 191 for making the roller shaft 192 of the resist roller pair 191 parallel to the side of the leading edge of the recording paper P, based on the detected tilt of the recording paper P (step S2).

The resist-less controller 301 transmits tilt data indicating the determined direction and amount of tilt of the roller shaft 192 to the engine controller 201 through serial communication (step S3). After step S3, the resist-less controller 301 controls the turning motor 41 based on the determined direction and amount of tilt of the roller shaft 192 to rotate the rotation board 30 and tilt the roller shaft 192 of the resist roller pair 191 (step S4).

Figure 9:
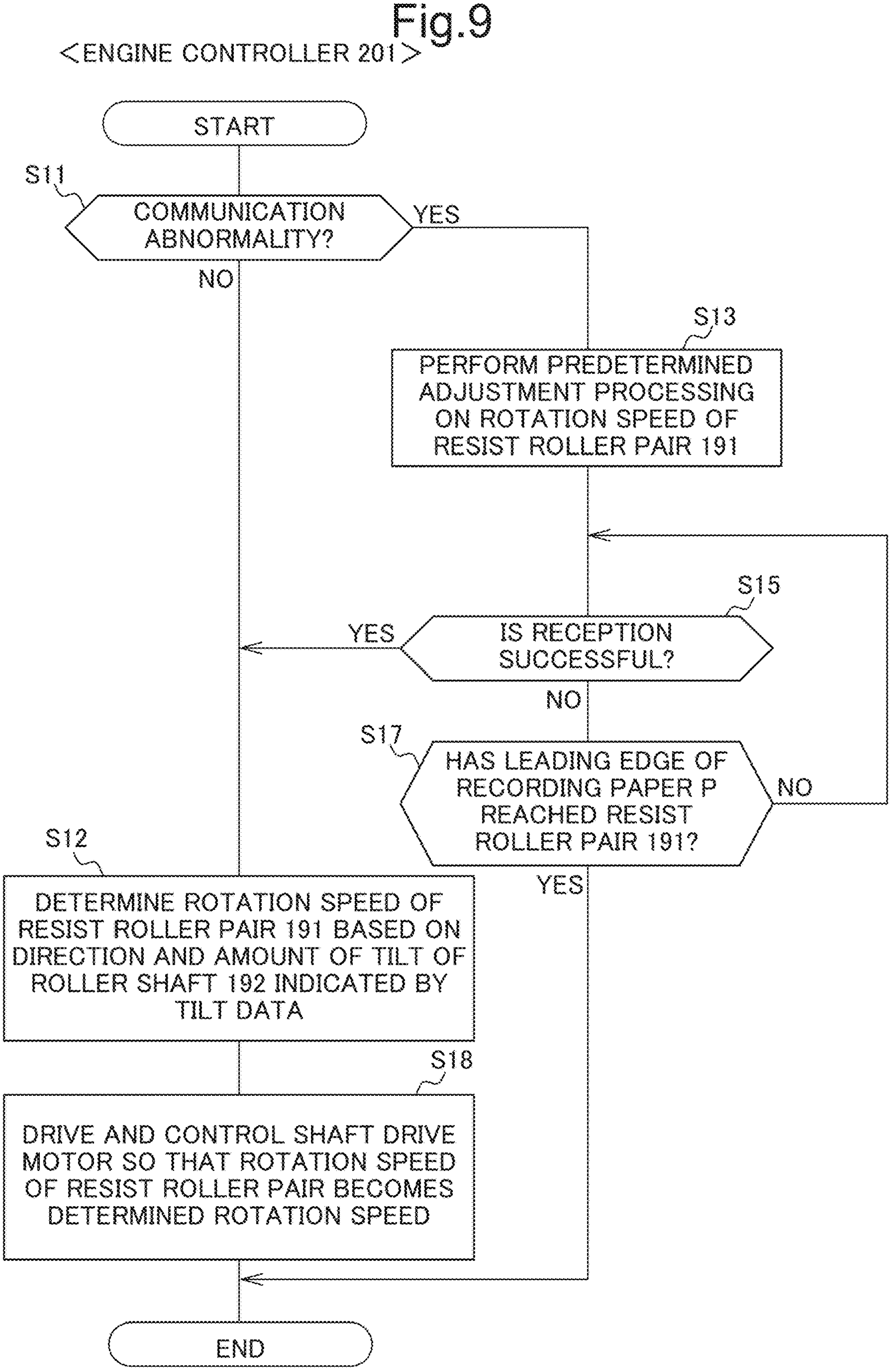
FIG. 9 is a flowchart showing an example of second rotation speed adjustment processing.

Next, an example of the second rotation speed adjustment processing performed by the engine controller 201 will be described with reference to a flowchart shown in FIG. 9, and the like. The engine controller 201 performs the second rotation speed adjustment processing when receiving data transmitted from the resist-less controller 301 through serial communication.

The engine controller 201 determines whether or not a communication abnormality for the tilt data transmitted from the resist-less controller 301 through the serial communication has occurred (step S11). The engine controller 201 on the reception side of serial communication detects, for example, a known parity error, overrun error, or framing error as a communication abnormality.

When the engine controller 201 determines that no communication abnormality has occurred (NO in step S11), the engine controller 201 determines the rotation speed of the resist roller pair 191 according to the direction and amount of tilt of the roller shaft 192 indicated by the normally received tilt data (step S12). The engine controller 201 determines, for example, the rotation speed of the resist roller pair 191 using the data table or coefficients stored in the nonvolatile memory or the storage device 8 built in the engine control device 200, similarly to the first embodiment.

After the processing in step S12, the engine controller 201 drives and controls the shaft drive motor 35 so that the rotation speed of the resist roller pair 191 becomes the determined rotation speed of the resist roller pair 191 (step S18). Accordingly, the rotation speed of the resist roller pair 191 is corrected. The processing in step S18 is performed after the resist-less controller 301 tilts the roller shaft 192 of the resist roller pair 191, based on the determined direction and amount of tilt of the roller shaft 192 (that is, after step S4 shown in FIG. 8).

When the engine controller 201 determines that no communication abnormality has occurred, the engine controller 201 transmits response data indicating that the tilt data has been successfully received to the resist-less controller 301.

On the other hand, when the engine controller 201 determines that a communication abnormality has occurred (YES in step S11), that is, when the communication abnormality for the tilt data is detected, the engine controller 201 performs predetermined adjustment processing for the rotation speed of the resist roller pair 191 (step S13). When the engine controller 201 determines that the communication abnormality has occurred, the engine controller 201 transmits response data indicating that the tilt data could not be received normally to the resist-less controller 301. When the resist-less controller 301 receives the response data from the engine controller 201, the resist-less controller 301 executes the transmission retry processing for the tilt data.

As the predetermined adjustment processing, the engine controller 201 performs, for example, (i) processing for changing the rotation speed of the resist roller pair 191 to a predetermined low speed that is lower than a predetermined rotation speed at a normal time when no communication abnormality has occurred, (ii) processing for changing the rotation speed of the resist roller pair 191 based on a type or size of the recording paper P, or (iii) processing for correcting the rotation speed of the resist roller pair 191 based on the tilt data normally received at a previous time.

The case (ii) will be described. In the image forming apparatus 1, it is more difficult for the recording paper P that is too thick or too thin to be handled than the recording paper P with a standard thickness. Further, it is more difficult for the recording paper P that is too long or too short in a width direction to be handled than the recording paper P with a standard length. Therefore, the engine controller 201 may temporarily stop the rotation of the resist roller pair 191 as processing for changing the rotation speed of the resist roller pair 191, for example, in at least one of a case where a thickness of the recording paper P is outside of a predetermined range and a case where a size of the recording paper P is outside of a predetermined range.

After the processing in step S13, the engine controller 201 determines whether or not the tilt data retransmitted through the retry processing in the resist-less controller 301 has been successfully received (step S15).

When the engine controller 201 determines that the tilt data has been successfully received (YES in step S15), the engine controller 201 determines the rotation speed of the resist roller pair 191 according to the direction and amount of tilt of the roller shaft 192 indicated by the tilt data (step S12). After the processing in step S12, the engine controller 201 drives and controls the shaft drive motor 35 so that the rotation speed of the resist roller pair 191 becomes the determined rotation speed of the resist roller pair 191 (step S18). Accordingly, the rotation speed of the resist roller pair 191 is corrected.

In step S18, the engine controller 201 may further determine the rotation speed of the resist roller pair 191 based on a time required for recovery from the occurrence of the communication abnormality to the normal reception of the tilt data, in addition to the type or size of the recording paper.

For example, as shown in FIG. 3, when the resist roller pair 191 is tilted downstream with respect to the transport direction D, the engine controller 201 corrects the rotation speed of the resist roller pair 191 so that the rotation speed increases, but determines the rotation speed of the resist roller pair 191 so that the rotation speed of the resist roller pair 191 further increases as the time required for recovery becomes longer.

On the other hand, as shown in FIG. 4, when the resist roller pair 191 is tilted upstream with respect to the transport direction D, the engine controller 201 corrects the rotation speed of the resist roller pair 191 so that the rotation speed decreases, but determines the rotation speed of the resist roller pair 191 so that the rotation speed of the resist roller pair 191 further decreases as the time required for recovery becomes longer.

On the other hand, when the engine controller 201 determines that the tilt data has not been successfully received (NO in step S15), the engine controller 201 determines whether or not the leading edge of the recording paper P has reached the resist roller pair 191 based on a signal transmitted from the resist sensor 195 (step S17).

That is, the engine controller 201 determines whether or not the tilt data retransmitted through the retry processing in the resist-less controller 301 has been successfully received (step S15) until the leading edge of the recording paper P reaches the resist roller pair 191 (NO in step S17). When the engine controller 201 determines that the retransmitted tilt data has been successfully received (Yes in step S15) until the leading edge of the recording paper P reaches the resist roller pair 191 (No in step S17), the engine controller 201 determines the rotation speed of the resist roller pair 191 according to the direction and amount of tilt of the roller shaft 192 indicated by the tilt data (step S12). After the processing in step S12, the engine controller 201 performs the processing in step S18.

After the processing in step S18, when the resist-less controller 301 receives the signal indicating that the leading edge of the recording paper P has been detected, which is transmitted from the resist sensor 195, the resist-less controller 301 calculates the nip timing based on the reception timing of the signal as in the first embodiment. When the calculated nip timing arrives, the resist-less controller 301 controls the turning motor 41 to rotate the rotation board 30 and return the roller shaft 192 of the resist roller pair 191 to the initial state.

Here, similarly to the first embodiment, in step S12, the rotation speed of the resist roller pair 191 determined by the engine controller 201 is set to a rotation speed at which the timing at which the leading edge of the recording paper P fed by the resist roller pair 191 when the resist roller pair 191 tilted as described above is returned to the initial state in a state where the resist roller pair 191 nips the recording paper P reaches the nip portion N1 between the intermediate transfer belt 125 and the drive roller 125A becomes a timing at which the leading edge reaches in a case where the recording paper P is not tilted with respect to the transport direction D, the resist roller pair 191 remains in the initial state, and the recording paper P is fed by the resist roller pair 191 at a rotation speed before correction.

On the other hand, when the engine controller 201 does not determine that the retransmitted tilt data has been successfully received before the leading edge of the recording paper P reaches the resist roller pair 191 (NO in step S15 and YES in S17), the engine controller 201 ends the second rotation speed adjustment processing.

Incidentally, the engine controller 201 corrects the rotation speed of the resist roller pair 191, based on the direction and amount of tilt of the roller shaft 192 in order to supply the recording paper P to the image forming device at an appropriate timing. However, in the present embodiment, since the engine controller 201 that performs control for rotating the resist roller and the resist-less controller 301 that performs control for tilting the roller shaft 192 are independent, it is necessary to transmit the tilt data from the resist-less controller 301 to the engine controller 201.

However, when the communication abnormality occurs and the tilt data is not normally received by the engine controller 201, it becomes difficult for the engine controller 201 to appropriately correct the rotation speed. As a result, there is concern that image formation on the recording paper P may be adversely affected.

On the other hand, according to the second embodiment, when the communication abnormality for the tilt data has occurred, the predetermined adjustment processing for the rotation speed of the resist roller pair 191 is performed instead of the correction of the rotation speed being performed. The execution of the adjustment processing curbs an adverse effect that occurs when the communication abnormality for the tilt data has occurred. Examples of the predetermined adjustment processing include performing the correction of the rotation speed of the resist roller pair 191 based on the tilt data normally received at a previous time, or lowering the rotation speed of the resist roller pair 191 than that at the normal time when no communication abnormality has occurred, as described above.

When the recording paper P is tilted with respect to the transport direction D, it is expected that the recording paper P is highly likely to be tilted to the same extent as when the recording paper P is transported at a previous time. Therefore, it is reasonable to perform the correction based on the tilt data normally received at a previous time.

In another embodiment, when the communication abnormality occurs, the engine controller 201 may control the drive motor 51 to perform the predetermined adjustment processing, which is processing for changing the rotation speed of the intermediate transport roller pair 194 to a predetermined low speed than is lower than that at the normal time when no communication abnormality has occurred. This makes it possible to buy time until the communication abnormality is resolved.

Third Embodiment

Hereinafter, an image forming apparatus 1 according to a third embodiment of the present invention will be described with reference to the drawings. The image forming apparatus 1 according to the third embodiment has the same configuration as the image forming apparatus 1 according to the first embodiment, except that the resist-less controller 301 executes third roller shaft tilt processing instead of the first roller shaft tilt processing, and the engine controller 201 executes third rotation speed adjustment processing instead of the first rotation speed adjustment processing. Hereinafter, the same configuration as that of the image forming apparatus 1 according to the first embodiment will not be repeatedly described.

Figure 10:
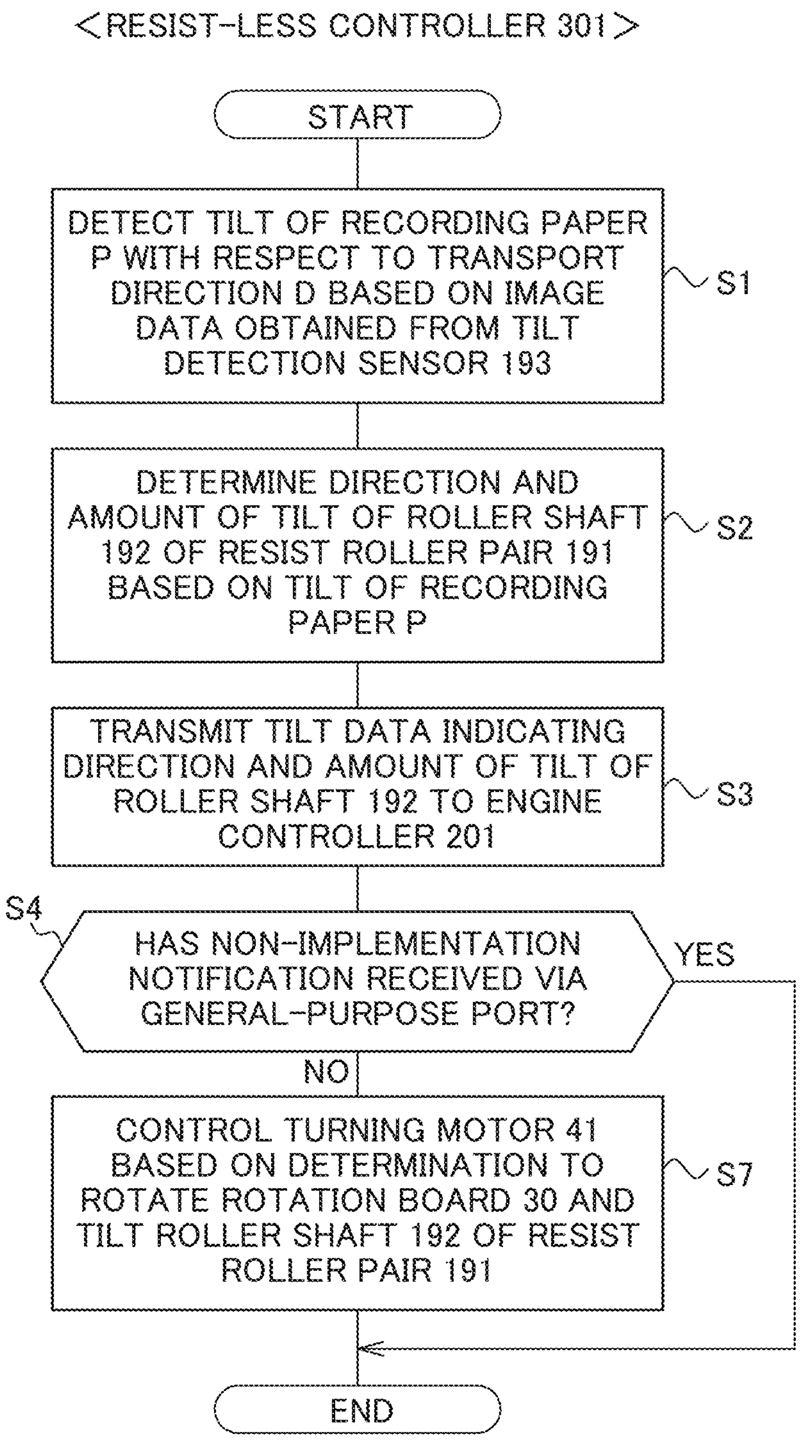
FIG. 10 is a flowchart showing an example of third roller shaft tilt processing.
Figure 11:
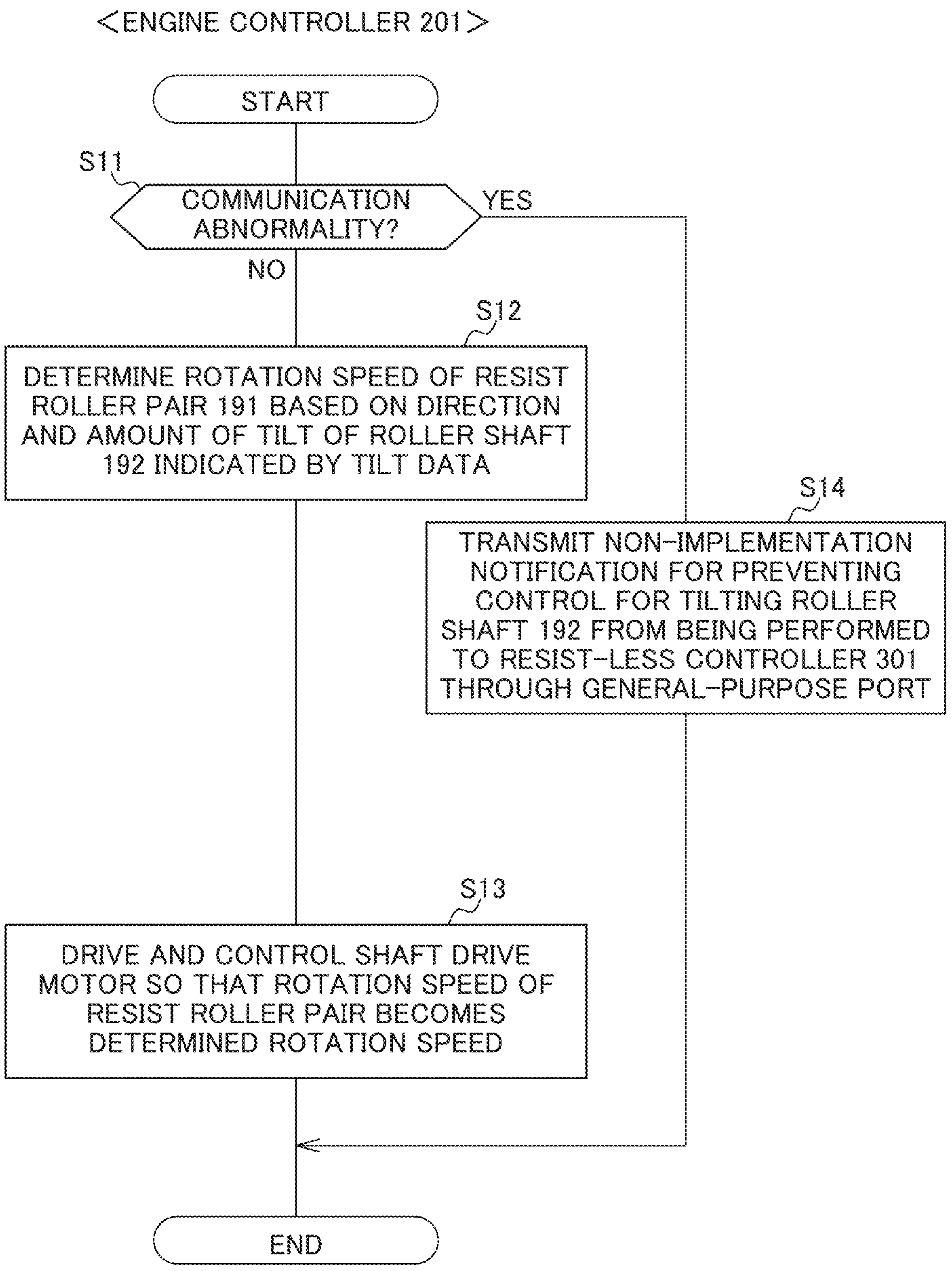
FIG. 11 is a flowchart showing an example of third rotation speed adjustment processing.

Next, an example of the third roller shaft tilt processing performed by the resist-less controller 301 will be described with reference to a flowchart shown in FIG. 10 and the like. The resist-less controller 301 performs the third roller shaft tilt processing when the leading edge of the recording paper P is detected based on the image data detected by the tilt detection sensor 193.

The resist-less controller 301 detects the tilt of the recording paper P with respect to the transport direction D, based on the image data detected by the tilt detection sensor 193 (step S1). The resist-less controller 301 determines the direction and amount of tilt of the roller shaft 192 of the resist roller pair 191 for making the roller shaft 192 of the resist roller pair 191 parallel to the side of the leading edge of the recording paper P, based on the detected tilt of the recording paper P (step S2).

The resist-less controller 301 transmits tilt data indicating the determined direction and amount of tilt of the roller shaft 192 to the engine controller 201 via the first communication line through serial communication (step S3). After the processing in step S3, the resist-less controller 301 determines whether or not a non-implementation notification has been received via a general-purpose port connected to the resist-less controller 301 to enable communication with the engine controller 201 (step S4).

As will be described in detail later, when the communication abnormality for the tilt data transmitted from the resist-less controller 301 occurs, the engine controller 201 transmits a predetermined non-implementation notification for preventing control for tilting the roller shaft 192 of the resist roller pair 191 from being performed to the resist-less controller 301 through the general-purpose port. When the resist-less controller 301 determines that the non-implementation notification is not received via the general-purpose port (NO in step S4), the resist-less controller 301 controls the turning motor 41 based on the determined direction and amount of tilt of the roller shaft 192 to rotate the rotation board 30 and tilt the roller shaft 192 of the resist roller pair 191 (step S7).

On the other hand, when the resist-less controller 301 determines that the non-implementation notification has been received via the general-purpose port (YES in step S4), the resist-less controller 301 ends the third roller shaft tilt processing without performing the processing in step S7.

Next, an example of the third rotation speed adjustment processing performed by the engine controller 201 will be described with reference to the flowchart shown in FIG. 10 and the like. The engine controller 201 performs the third rotation speed adjustment processing when receiving data transmitted from the resist-less controller 301 through the serial communication.

The engine controller 201 determines whether or not the communication abnormality for the tilt data transmitted from the resist-less controller 301 through the serial communication has occurred (step S11). The engine controller 201 on the reception side of the serial communication detects, for example, a known parity error, overrun error, or framing error as the communication abnormality.

When the engine controller 201 determines that no communication abnormality has occurred (NO in step S11), the engine controller 201 determines the rotation speed of the resist roller pair 191 according to the direction and amount of tilt of the roller shaft 192 indicated by the normally received tilt data (step S12). The engine controller 201 determines, for example, the rotation speed of the resist roller pair 191 using the data table or coefficients stored in the nonvolatile memory or the storage device 8 built in the engine control device 200, similarly to the first embodiment.

After the processing in step S12, the engine controller 201 drives and controls the shaft drive motor 35 so that the rotation speed of the resist roller pair 191 becomes the determined rotation speed of the resist roller pair 191 (step S13). Accordingly, the rotation speed of the resist roller pair 191 is corrected. The processing in step S18 is performed after the resist-less controller 301 tilts the roller shaft 192 of the resist roller pair 191 based on the determined direction and amount of tilt of the roller shaft 192 (that is, after step S7 shown in FIG. 10).

When the resist-less controller 301 receives the signal indicating that the leading edge of the recording paper P has been detected, which is transmitted from the resist sensor 195 after the processing in step S13, the resist-less controller 301 calculates the nip timing based on the reception timing of the signal as in the first embodiment. When the calculated nip timing arrives, the resist-less controller 301 controls the turning motor 41 to rotate the rotation board 30 and returns the roller shaft 192 of the resist roller pair 191 to the initial state.

Here, similarly to the first embodiment, in step S12, the rotation speed of the resist roller pair 191 determined by the engine controller 201 is set to a rotation speed at which the timing at which the leading edge of the recording paper P fed by the resist roller pair 191 when the resist roller pair 191 tilted as described above is returned to the initial state in a state where the resist roller pair 191 nips the recording paper P reaches the nip portion N1 between the intermediate transfer belt 125 and the drive roller 125A becomes a timing at which the leading edge reaches in a case where the recording paper P is not tilted with respect to the transport direction D, the resist roller pair 191 remains in the initial state, and the recording paper P is fed by the resist roller pair 191 at a rotation speed before correction.

On the other hand, when the engine controller 201 determines that the communication abnormality has occurred (YES in step S11), that is, when the engine controller 201 detects the communication abnormality for the tilt data, the engine controller 201 transmits the predetermined non-implementation notification for preventing control for tilting the roller shaft 192 of the resist roller pair 191 from being performed to the resist-less controller 301 through the general-purpose port connected to the engine controller 201 to enable communication with the resist-less controller 301 (step S14).

That is, the engine controller 201 transmits the non-implementation notification to the resist-less controller 301 via a general-purpose port serving as a second communication line different from the first communication line for performing communication of the tilt data. After the processing in step S14, the engine controller 201 ends the third rotation speed adjustment processing.

Incidentally, the engine controller 201 corrects the rotation speed of the resist roller pair 191, based on the direction and amount of tilt of the roller shaft 192 in order to supply the recording paper P to the image forming device at an appropriate timing. However, in the present embodiment, since the engine controller 201 that performs control for rotating the resist roller and the resist-less controller 301 that performs control for tilting the roller shaft 192 are independent, it is necessary to transmit the tilt data from the resist-less controller 301 to the engine controller 201.

However, when the communication abnormality occurs and the tilt data is not normally received by the engine controller 201, it becomes difficult for the engine controller 201 to appropriately correct the rotation speed. As a result, there is concern that image formation on the recording paper P may be adversely affected.

On the other hand, according to the third embodiment, when the communication abnormality for the tilt data has occurred, a non-implementation notification for preventing control for tilting the roller shaft 192 from being performed is transmitted from the engine controller 201 (the tilt data reception side) to the resist-less controller 301 (the tilt data transmission side). This makes it possible to prevent the roller shaft 192 of the resist roller pair 191 from being tilted in a situation where the rotation speed of the resist roller pair 191 cannot be corrected. As a result, it is possible to curb the adverse effect that occurs when the communication abnormality for the tilt data occurs.

Furthermore, since transmission of the non-implementation notification is performed via the second communication line different from the first communication line when an abnormality occurs in communication via the first communication line for performing communication of the tilt data, it becomes possible to reliably transmit the non-implementation notification to the resist-less controller 301, and it is possible to improve responsiveness. For example, the engine controller 201 can transmit the non-implementation notification to the resist-less controller 301 through simple processing such as switching the signal via the general-purpose port serving as the second communication line, which is normally "Low", to "High".

A scheme for detecting a communication abnormality in the engine controller 201 is not limited to the above-described method of detecting a parity error, an overrun error, or a framing error as the communication abnormality. For example, in another embodiment, when the engine controller 201 does not receive tilt data within a predetermined time when the tilt data is to be received at the normal time when no communication abnormality has occurred, the engine controller 201 may determine that the communication abnormality has occurred.

For example, the engine controller 201 measures the predetermined time when the tilt data is to be received, by monitoring a transport situation of the recording paper P. For example, the engine controller 201 detects a timing when the leading edge of the recording paper P has reached the intermediate transport roller pair 194 based on a signal obtained from the intermediate sensor 196, and measures the elapsed time from a point in time when the leading edge of the recording paper P has reached the intermediate transport roller pair 194.

The engine controller 201 calculates a time T required from the point in time when the leading edge of the recording paper P has reached the intermediate transport roller pair 194 to a point in time when the leading edge of the recording paper P reaches the resist roller pair 191, based on the rotation speed of the intermediate transport roller pair 194. When the engine controller 201 does not receive the tilt data until the elapsed time reaches time T, the engine controller 201 determines that a communication abnormality for the tilt data has occurred.

The present invention is not limited to the configuration of the above embodiments, and various modifications are possible. Further, the configuration and processing of the embodiment shown using FIGS. 1 to 11 are merely one embodiment of the present invention, and the present invention is not intended to be limited to the configuration and processing.

The invention claimed is:

1. An image forming apparatus comprising:

an image forming device configured to form an image on recording paper;

a resist roller provided upstream of the image forming device in a predetermined recording paper transport direction and configured to feed the recording paper to the image forming device;

a first controller includes a first processor and configured to perform rotation control for the resist roller, through the first processor executing a first control program;

a tilt detection sensor configured to detect a tilt of the recording paper with respect to the transport direction;

a tilt mechanism configured to tilt a roller shafts of the resist roller whose initial state is a state where the roller shaft is perpendicular to the transport direction, upstream or downstream with respect to the transport direction; and a second controller includes a second processor and configured to perform control for causing the tilt mechanism to tilt the roller shaft upstream or downstream with respect to the transport direction based on a detection result of the tilt detection sensor, and causing the tilt mechanism to return the tilted roller shaft to the initial state when the recording paper reaches the resist roller, through the second processor executing a second control program, wherein the second controller transmits tilt data indicating a direction and amount of tilt of the roller shaft to the first controller, and the first controller corrects a rotation speed of the resist roller based on the direction and amount of tilt of the roller shaft indicated by the tilt data received from the second controller, wherein the second controller determines tilt data indicating a direction and amount of tilt of the roller shaft based on a detection result of the tilt detection sensor, and transmits a predetermined command code having a smaller data amount than the tilt data to the first controller, instead of transmitting the tilt data to the first controller, when the direction and amount of tilt of the roller shaft determined at a current time is the same as the direction and amount of tilt of the roller shaft determined at a previous time or when a difference between both is within a predetermined setting range, and the first controller performs the correction of the rotation speed using the tilt data received at a previous time when the first controller has received the command code.

2. The image forming apparatus according to claim 1, wherein the second controller transmits any one of the tilt data and the command code to the first controller using serial communication.

3. The image forming apparatus according to claim 1, wherein the second controller executes retry processing for the transmission when the second controller detects a communication abnormality for transmission of any one of the tilt data and the command code.

4. An image forming apparatus comprising:

an image forming device configured to form an image on recording paper;

a resist roller provided upstream of the image forming device in a predetermined recording paper transport direction and configured to feed the recording paper to the image forming device;

a first controller includes a first processor and configured to perform rotation control for the resist roller, through the first processor executing a first control program;

a tilt detection sensor configured to detect a tilt of the recording paper with respect to the transport direction;

a tilt mechanism configured to tilt a roller shafts of the resist roller whose initial state is a state where the roller shaft is perpendicular to the transport direction, upstream or downstream with respect to the transport direction; and a second controller includes a second processor and configured to perform control for causing the tilt mechanism to tilt the roller shaft upstream or downstream with respect to the transport direction based on a detection result of the tilt detection sensor, and causing the tilt mechanism to return the tilted roller shaft to the initial state when the recording paper reaches the resist roller, through the second processor executing a second control program, wherein the second controller transmits tilt data indicating a direction and amount of tilt of the roller shaft to the first controller, and the first controller corrects a rotation speed of the resist roller based on the direction and amount of tilt of the roller shaft indicated by the tilt data received from the second controller, wherein the first controller performs the correction of the rotation speed of the resist roller when a communication abnormality for the tilt data is not detected, and performs predetermined adjustment processing for the rotation speed of the resist roller when a communication abnormality is detected.

5. The image forming apparatus according to claim 4, wherein, when the first controller detects the communication abnormality, the first controller performs processing for changing the rotation speed based on a type or size of the recording paper as the adjustment processing.

6. The image forming apparatus according to claim 4, wherein, when the first controller detects the communication abnormality, the first controller performs, as the adjustment processing, processing for changing the rotation speed to a predetermined low speed that is lower than that at a normal time when no communication abnormality has occurred.

7. The image forming apparatus according to claim 4, wherein when the first controller detects the communication abnormality, the first controller performs, as the adjustment processing, processing for correcting the rotation speed based on the tilt data received normally at a previous time.

8. The image forming apparatus according to claim 5, wherein when the second controller detects the communication abnormality, the second controller executes retry processing for the transmission, and when the first controller receives the tilt data, the first controller further performs the correction of the rotation speed, based on a time required for recovery from the occurrence of the communication abnormality to a time when the tilt data was received normally, in addition to a type or size of the recording paper.

9. The image forming apparatus according to claim 4, further comprising:

an intermediate transport roller provided upstream of the resist roller in the transport direction and configured to transport the recording paper to the resist roller, wherein when the communication abnormality occurs, the first controller performs, as the adjustment processing, processing for changing a rotation speed of the intermediate transport roller to a predetermined low speed that is lower than that at a normal time when no communication abnormality has occurred.

10. The image forming apparatus according to claim 5, wherein the first controller temporarily stops the rotation of the resist roller as processing for changing the rotation speed of the resist roller in at least one of a case where a thickness of the recording paper is outside of a predetermined range and a case where a size of the recording paper is outside of a predetermined range.

11. An image forming apparatus comprising:

an image forming device configured to form an image on recording paper;

a resist roller provided upstream of the image forming device in a predetermined recording paper transport direction and configured to feed the recording paper to the image forming device;

a first controller includes a first processor and configured to perform rotation control for the resist roller, through the first processor executing a first control program;

a tilt detection sensor configured to detect a tilt of the recording paper with respect to the transport direction;

a tilt mechanism configured to tilt a roller shafts of the resist roller whose initial state is a state where the roller shaft is perpendicular to the transport direction, upstream or downstream with respect to the transport direction; and a second controller includes a second processor and configured to perform control for causing the tilt mechanism to tilt the roller shaft upstream or downstream with respect to the transport direction based on a detection result of the tilt detection sensor, and causing the tilt mechanism to return the tilted roller shaft to the initial state when the recording paper reaches the resist roller, through the second processor executing a second control program, wherein the second controller transmits tilt data indicating a direction and amount of tilt of the roller shaft to the first controller, and the first controller corrects a rotation speed of the resist roller based on the direction and amount of tilt of the roller shaft indicated by the tilt data received from the second controller, wherein the second controller transmits the tilt data to the first controller via a first communication line, and the first controller performs the correction of the rotation speed of the resist roller when the communication abnormality for the tilt data is not detected, and transmits a predetermined non-implementation notification for preventing the second controller from performing the control on the roller shaft to the second controller via a second communication line different from the first communication line when the communication abnormality is detected.

12. The image forming apparatus according to claim 11, further comprising:

a general-purpose port connected to the first controller as the second communication line, wherein the first controller transmits the non-implementation notification to the second controller via the general-purpose port.

13. The image forming apparatus according to claim 11, wherein the second controller does not perform the control for the roller shaft when receiving the non-implementation notification.

14. The image forming apparatus according to claim 11, wherein the first controller determines that the communication abnormality has occurred when the tilt data is not received within a predetermined time when the tilt data is to be received at a normal time when no communication abnormality has occurred.

15. The image forming apparatus according to claim 14, wherein the first controller measures the predetermined time when the tilt data is to be received, by monitoring a transport situation of the recording paper.

16. The image forming apparatus according to claim 15, further comprising:

an intermediate transport roller provided upstream of the resist roller in the transport direction to transport the recording paper to the resist roller, wherein the first controller measures an elapsed time from a point in time when a leading edge of the recording paper reaches the intermediate transport roller, and determines that the communication abnormality has occurred, when the tilt data has not been received before the elapsed time reaches a time required until the leading edge of the recording paper reaches the resist roller from a time when the leading edge of the recording paper reaches the intermediate transport roller.

* * * * *